United States Patent [19]

McArthur

[11] Patent Number: 5,747,680
[45] Date of Patent: May 5, 1998

[54] MULTIPLE PARAMETER SENSOR AND METHOD OF OPERATION THEREOF

[75] Inventor: Malcolm J. McArthur, Escondido, Calif.

[73] Assignee: Sundstrand Corporation, Rockford, Ill.

[21] Appl. No.: 630,572

[22] Filed: Apr. 10, 1996

[51] Int. Cl.$^6$ ............................................. G01M 15/00
[52] U.S. Cl. ............................................. 73/117.3
[58] Field of Search ............................ 73/1.37, 1.41, 73/35.03, 35.06, 116, 117.3, 514.16, 514.39

[56] References Cited

U.S. PATENT DOCUMENTS

| | | | |
|---|---|---|---|
| 3,431,779 | 3/1969 | Wilken et al. | 73/291 |
| 3,467,358 | 9/1969 | Zablotsky et al. | 253/77 |
| 3,758,756 | 9/1973 | Johns | 235/92 |
| 4,153,388 | 5/1979 | Naegeli et al. | 416/61 |
| 5,067,355 | 11/1991 | Witte | 73/862.3 |
| 5,197,325 | 3/1993 | Tamura et al. | 73/117.3 |
| 5,529,041 | 6/1996 | Andrews | 73/117.3 |
| 5,537,322 | 7/1996 | Denz et al. | 73/117.3 |

OTHER PUBLICATIONS

"Evolution and Innovation for Shaft Torque and RPM Measurement for the 1990s and Behond" by James R. Parkinson, appearing in publication *Sensor Systems*, Sep. 1990 Aerospace, Simmonds Precision Aircraft Systems, p. 1.

*Primary Examiner*—George M. Dombroske
*Assistant Examiner*—Eric S. McCall
*Attorney, Agent, or Firm*—Antonelli, Terry, Stout & Kraus, LLP

[57] ABSTRACT

A multiple parameter sensor is disclosed having a preferred application in a turbine used in an auxiliary power unit. The multiple parameter sensor includes a first part (12) for rotation with a rotating member (14) having a speed of rotation to be measured; a second part (20) mounted in a fixed position adjacent the first part to respond to the speed of rotation of the first part to produce a first periodic signal (22), the second part in response to the first periodic signal producing a second signal representing the speed of rotation of the rotating member and comprising electrical winding (26) in which the first periodic signal is magnetically induced by rotation of the first part with the rotating member; and wherein the second part produces at least one additional signal with each additional signal representing one additional parameter of operation of the device associated with the rotating member.

24 Claims, 2 Drawing Sheets

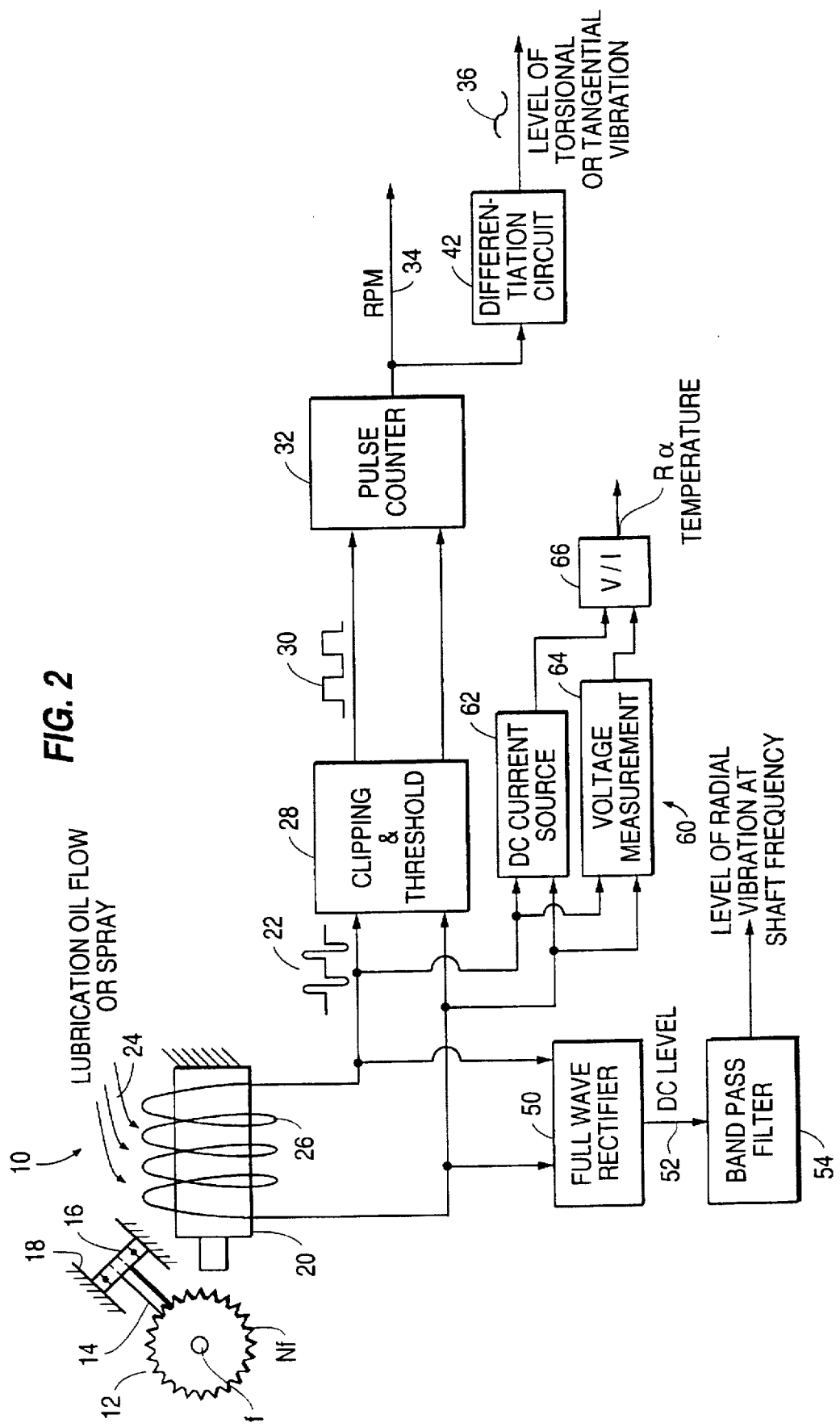

MULTIPLE PARAMETER SENSOR AND METHOD OF OPERATION THEREOF

DESCRIPTION

1. Technical Field

The present invention relates to sensors for sensing operational parameters of rotating machinery including the speed of a rotating member and more particularly to sensors of the aforementioned type which in addition to sensing the rotating speed of a rotating member also sense at least one additional parameter of operation of a device associated with the rotating member.

2. Background Art

The assignee of the present invention manufactures auxiliary power units (APU) which are utilized to generate power for airframes. An APU includes a gas turbine which has numerous mechanical structures requiring monitoring of operational parameters, such as turbine shaft rotational speed, oil temperature, and measuring of turbine shaft vibration to determine possible machinery failure such as bearing failure.

Current designs of APUs have separate sensors for measuring shaft rotation speed, oil temperature, and other system parameters. Because each of the sensors are separate, the housing of the APU becomes more complicated and the electrical wiring associated with each of the sensors extends from the position of the sensor to the electronic control unit of the turbine.

Gas turbines are known which use a radiation pyrometer to measure the speed of rotation of the turbine shaft and temperature of the blades. These devices sense the level of infrared radiation as a measure of the temperature of the turbine blades and detect a periodic variation in the level of the infrared signal indicative of the temperature of the individual blades to measure the rotational speed of the shaft. Infrared radiation sensors do not utilize electrical windings in which a periodic signal representative of the shaft rotational speed is induced.

FIG. 1 illustrates a block diagram of a prior art APU of the type manufactured by the assignee illustrating the technique utilized for measuring shaft rotation. The rotational speed sensor 10 is a two-part unit having a first part 12 in the form of gear wheel having a number of N teeth which are magnetically permeable. The gear wheel is attached to a rotating shaft 14 of the turbine which is rotatably supported by bearings 16 mounted in a housing 18. The construction of the turbine is well known, is not part of the present invention and has been omitted from illustration to avoid complicating the illustration of the invention. The second part 20 of the speed sensor 10 is mounted in a fixed position attached to the housing 18 adjacent the first part. The second part 20 responds to the speed of rotation f of the first part 12 to produce a periodic signal 22 representing the speed of rotation of the rotating member 14. The second part 20 is located typically in an oil sump or within a transmission housing which is splashed with lubricating oil 24. As has been described above, it is desirable to sense the temperature of the lubricating oil 24 to measure turbine performance. However, in the prior art of FIG. 1, the measuring of the temperature of the lubricating oil is accomplished by another sensor (not illustrated). The second part 20 has an electrical winding 26 in which the periodic signal 22 is induced by variation in the reluctance between the first part 12 and the second part 20 which is caused by the rotation of the N teeth past the adjacent second part. Either the teeth N or the second part are magnetized so that a variation in the magnetic field coupled to the winding 26 induces the periodic signal in a well-known manner. The periodic signal 22 is applied to a clipping and threshold circuit 28 which converts the periodic signal into a clipped signal 30 which steps between first and second levels in a periodic fashion and resembles a squarewave although, in actual practice, the time duration of the individual signal levels does not necessarily have to be equal as illustrated by waveform 30. The waveform 30 is applied to a pulse counter 32 which processes the time varying signal 30 into an R.P.M. output signal 34 which represents the rotational speed f of the rotating member 14. Furthermore, a continuity check circuit 36 is electrically coupled to the electrical winding 26 to determine if the electrical winding is operational to prevent starting of the turbine without an operational sensing of the operational status of the speed sensor 10.

A typical APU of the Assignee operates with an oil temperature of approximately 250° F. with temperatures above 320° F. being undesirable for sustained operation thereof. In the prior art, an individual temperature sensor dedicated exclusively to temperature sensing has been used to monitor the temperature of the oil 24.

The spacing between the individual teeth N of the first part 12 and the second part 20 is typically such that a variation in gap of 0.005 inches gives a 10% output voltage variation. Therefore, any radial vibration of the turbine shaft 14 can cause a cyclical variation in the amplitude of the periodic signal 22.

The first part has a number of teeth N varying typically between 4 and 10. An APU typically operates at a constant rotational shaft speed such as 50,000 R.P.M.

In the prior art, the electrical resistance of the winding 26 in commercially available sensors has a resistance depending upon the unit selected of between 60 ohms and 400 ohms. The resistance of copper wire which is used in the winding 26 varies approximately ⅓ of 1% per degree centigrade.

DISCLOSURE OF INVENTION

The present invention is a multiple parameter sensor and method of operation thereof having a preferred application for use in a turbine such as in an APU. However, it should be understood that the present invention is not limited thereto and has applications in diverse types of rotating machinery for measuring shaft rotational speed and at least one additional parameter with a single sensor. With the invention, a first part is mounted for rotation with a rotating member having a speed of rotation to be measured. A second part, which is mounted in a fixed position adjacent the first part, responds to the speed of rotation of the first part to produce a first signal and a second signal in response to the first signal representing the speed of rotation of the rotating member and further, at least one additional signal which each additional signal representing one additional parameter of operation of a device associated with the rotating member. At least one frequency band in the second signal representing the speed of rotation of the rotating member is processed to produce at least one additional signal representing at least one additional parameter. Torsional or tangential vibration of the rotating member may be sensed by differentiating the second signal to produce another signal and processing the magnitude variation thereof to determine the velocity of the vibration and the frequency thereof to determine the frequency of vibration to provide a measure of torsional or tangential vibration of the rotating member. Furthermore, the first signal produced by the electrical winding is fullwave rectified and bandpass filtered with a bandpass centered around the rotational frequency f of the rotating member to produce another signal representing a level of radial vibration at the rotational shaft speed f. As has been explained above, variation in spacing between the rotating first part and the stationary second part of the speed sensor produces a variation in amplitude of the output voltage produced by the electrical winding therein which is fullwave rectified, bandpass filtered to produce an output indicating when an unacceptable level of radial vibration of the rotating member has occurred which causes a periodic variation in spacing between the first part and the second part of the speed sensor during rotation of the rotating member.

Finally, a resistance measuring device may be attached to the electrical winding of the velocity sensor to determine a variation in the electrical resistance thereof which may be processed to output a temperature signal representing the temperature of lubricating oil contacting the second part, such as in an oil system of a turbine.

The present invention simplifies the construction of complicated rotating machinery, such as turbines, which require multiple parameter sensing, such as rotational speed, temperature and shaft radial, torsional or tangential vibration by achieving sensing of at least one additional parameter with a single sensing device which has a first part mounted for rotation with a rotating member and a second stationary part adjacent the rotating member in addition to the prior art sensing of speed of rotation of the first part which rotates with the rotating member.

BRIEF DESCRIPTION OF THE DRAWINGS

FIG. 2 illustrates a block diagram of a preferred embodiment of the present invention in which the rotational speed sensor of a rotating shaft of FIG. 1 has been modified to monitor multiple parameters of operation of a turbine in addition to the rotational speed of the rotating member.

BEST MODE FOR CARRYING OUT THE INVENTION

Figure 1:
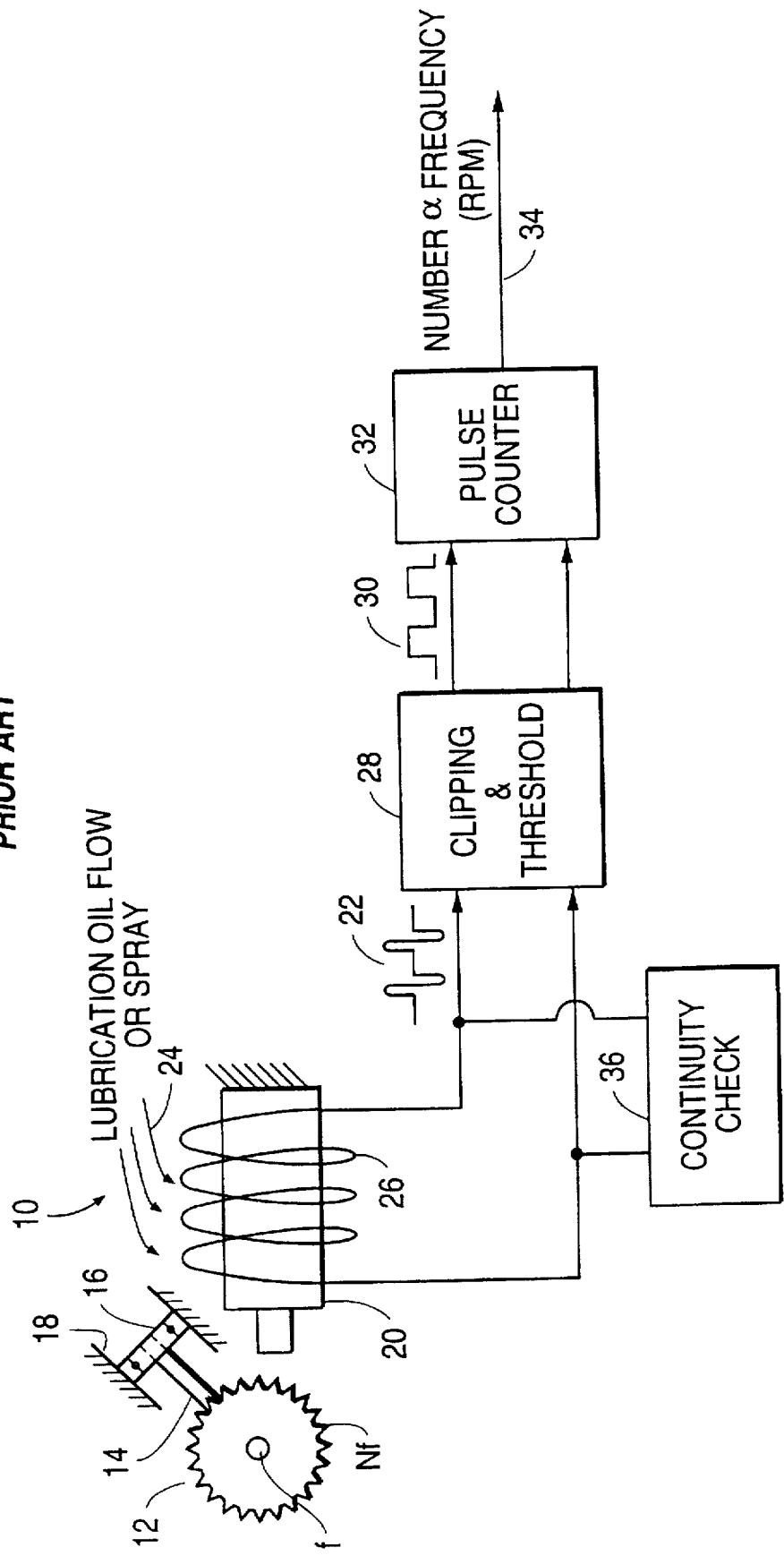
FIG. 1 illustrates a block diagram of a prior art velocity sensor of the type utilized by the assignee in APUs.

FIG. 2 illustrates a block diagram of a preferred embodiment of the present invention, which is a modification of the prior art of FIG. 1, to include the sensing of at least one additional parameter of operation of a device having a rotating member in addition to sensing rotational speed. The winding 26 produces a first signal 22. The second signal 34, which is produced in response to the first signal 22, represents the R.P.M.s of the rotating member 14. The additional parameters, which are measured in the illustrated system, are torsional, tangential and radial vibration of the rotating member 14 and further, the temperature of the oil associated with the second part 20 of the rotational speed sensor 10.

Detection of torsional or tangential vibration is based upon an analysis of variation in another signal 36 produced by differentiation circuit 42 of the second signal 34 representing R.P.M. The signal 36 typically is periodic and usually has a sinusoidal component representative of at least one of torsional or tangential vibration of the rotating shaft 14. The signal 36 is representative of the velocity and frequency of the torsional and/or tangential vibration of the rotating member 14. Variation in magnitude and frequency of the signal 36 is representative of and is proportional to the vibration.

A measure of radial vibration at the shaft rotational speed f is produced by processing the first periodic signal 22 with a fullwave rectifier 50 to produce a DC signal 52 having an amplitude representative of the relative spacing between the first part 12 and the second part 20. As has been explained above, a small change, such as 0.005 inches in gap between the first part 12 and the second part 20, produces an output voltage change, such as 10%. Therefore, radial vibration of the rotating shaft 14, which is periodically occurring at the shaft rotational speed f, produces a periodic variation in the DC signal 52. The DC signal 52 is applied to a bandpass filter 54 to produce another signal having a bandpass centered around the rotational speed f of the rotating member 14 to remove undesirable frequency components which are not representative of radial shaft variation at the rotational speed f of the rotating member 14. The another signal produced by the bandpass filter 54 is proportional to a level of radial vibration and provides a basis to indicate when the vibration becomes unacceptably high which occurs when a variation therein varies beyond a threshold of dynamic variation representative of undesired radial vibration of the rotating member 14 in the bandpass centered at the rotational speed.

As has been described above in conjunction with the prior art, vibration of the rotating member 14 may be used as a diagnostic technique or a predictor of ultimate mechanical failure of parts of a turbine, such as bearings 16, which rotatably support the rotating turbine wheel 14. Thus, it is seen that the signal produced by the electrical winding 26, which is conventionally processed to indicate the rotating speed f of the rotating member 14, is further processed in at least one frequency band therein to produce a measure of multiple parameters of operation associated with rotation of the rotating member 14. The differentiation circuit 42 detects the rate of change and the bandpass filter 54 passes frequency components centered about the speed f of the shaft 14 and are responsive to a frequency band within the first periodic output signal 22 produced by the winding 26.

Additionally, a resistance measuring device 60, such as that comprised of a DC current source 62, a voltage measurement circuit 64 and a dividing circuit 66 senses the electrical resistance of the winding 26 to produce an output signal representing the resistance of the winding 26. As has been described above, the electrical resistance of the winding 26 varies typically at ⅓ of 1% per degree centigrade. As a result, variation in the temperature of oil 24 may be sensed by detecting the variation in the output resistance signal from the dividing circuit 66 which represents variation in the resistance of the winding 25.

While the invention has been described in terms of its preferred embodiment, which is a multiple parameter sensor for use in turbines, such as that contained in a APU, it should be understood that the invention is applicable to diverse applications where a measure of both the speed of rotation of a rotating member and additional parameters representing operation of a device are required to be sensed by a single sensor. In the embodiment of the invention described above, applications of the invention may be for devices which vary in speed of rotation. In that circumstance, the bandpass filter 54 must be dynamically tuned to track the rotational shaft speed variation of the rotating member 14. Furthermore, the analysis of the signal 36 requires the rotational speed f of the rotating member 14 to be in a steady state.

While the invention has been described in terms of its preferred embodiment, it should be understood that numerous modifications may be made thereto without departing from the spirit and scope of the invention. It is intended that all such modifications fall within the scope of the appended claims.

I claim:

1. A multiple parameter sensor comprising:

a first part for rotation with a rotating member having a speed of rotation to be measured;

a second part for generating a first signal in response to rotation of the rotating member, the second part being adapted to be mounted in a fixed position adjacent the first part and in response to the first signal producing a second signal representing the speed of rotation of the rotating member; and wherein the second part includes at least one circuit responsive only to the first signal with each circuit producing an additional signal, which is different than the first signal, with each additional signal being an output of one additional parameter of operation of a device associated with the rotating member; and each circuit modifies at least one frequency band of the first signal in producing the output signal.

2. A sensor in accordance with claim 1 wherein:

the second part further produces an additional signal which is a measure of temperature at the second part.

3. A sensor in accordance with claim 1 wherein:

the at least one additional parameter is a measure of at least one of torsional and tangential vibration of the rotating member.

4. A sensor in accordance with claim 1 wherein:

the at least one additional parameter is a measure of radial vibration of the rotating member.

5. A sensor in accordance with claim 2 wherein the second part further comprises:

an electrical winding and a resistance measuring device electrically coupled to the electrical winding for measuring changes in resistance of the electrical winding which are proportional to changes in the temperature at the second part which are converted into a temperature reading of the temperature at the second part.

6. A sensor in accordance with claim 3 wherein:

the first signal is periodic; and the at least one circuit comprises a differentiation circuit, coupled to the first periodic signal, for producing a differentiated signal with a magnitude and frequency of the differentiation being proportional to the vibration.

7. A sensor in accordance with claim 4 wherein:

the at least one circuit comprises a bandpass filter having an input coupled to the first signal and an output signal of a level of radial vibration of the rotating member.

8. A sensor in accordance with claim 7 wherein:

the bandpass is centered on a frequency equal to a rotational velocity of the rotating member.

9. A sensor in accordance with claim 8 further comprising:

a fullwave rectifier having an input coupled to the first signal and an output, which is a direct current signal having a magnitude proportional to the first signal, coupled to the input of the bandpass filter.

10. A sensor in accordance with claim 1 wherein:

the rotating member is a shaft of a turbine and the temperature of the second part represents a temperature of oil circulating in the turbine.

11. A multiple parameter sensor comprising:

a first part for rotation with a rotating member having a speed of rotation to be measured;

a second part adapted to be mounted in a fixed position adjacent the first part to respond to the speed of rotation of the first part to produce a periodic first signal, the second part producing a second signal, in response to the periodic first signal, representing the speed of rotation of the rotating member and comprising an electrical winding in which the periodic first signal is magnetically induced by rotation of the first part with the rotating member; and wherein the second part includes at least one circuit responsive only to the first signal with each circuit producing an additional signal with each additional signal being an output of one additional parameter of operation of a device associated with the rotating member.

12. A sensor in accordance with claim 11 wherein:

the at least one additional parameter is a measure of temperature at the second part.

13. A sensor in accordance with claim 11 wherein:

the at least one additional parameter is a measure of at least one of torsional and tangential vibration of the rotating member.

14. A sensor in accordance with claim 11 wherein:

the at least one additional parameter is a measure of radial vibration of the rotating member.

15. A sensor in accordance with claim 12 wherein the second part further comprises:

a resistance measuring device electrically coupled to the electrical winding for measuring changes in resistance of the electrical winding which are proportional to changes in the temperature at the second part which are converted into a temperature reading of the temperature at the second part.

16. A sensor in accordance with claim 13 wherein:

the at least one circuit comprises a differentiation circuit, coupled to the first periodic signal, for producing a differentiated second signal with a magnitude and frequency of the differentiation being proportional to the vibration.

17. A sensor in accordance with claim 14 wherein:

the at least one circuit comprises a bandpass filter having an input coupled to the first signal and an output representing a level of radial vibration of the rotating member.

18. A sensor in accordance with claim 17 wherein:

the bandpass is centered on a frequency equal to a rotational velocity of the rotating member.

19. A sensor in accordance with claim 18 further comprising:

a fullwave rectifier having an input coupled to the first periodic signal and an output, which is a direct current signal having a magnitude proportional to the first signal, coupled to the input of the bandpass filter.

20. A sensor in accordance with claim 11 wherein:

the rotating member is a shaft of a turbine and the temperature of the second part represents temperature of oil circulating in the turbine.

21. A method of measuring multiple parameters with a sensor comprising:

rotating a first part with a rotating member having a speed of rotation to be measured;

mounting a second part in a fixed position adjacent the first part responsive to the speed of rotation of the first part to produce a periodic first signal magnetically induced in an electrical winding and, in response to the first periodic signal producing a second signal representing the speed of rotation of the first part; and wherein the second part includes at least one circuit responsive only to the first periodic signal which each circuit producing at least one additional signal with each additional signal being an output of one additional parameter of operation of a device associated with the rotating member.

22. A method in accordance with claim 21 wherein:

the at least one additional parameter is a measure of temperature at the second part.

23. A method in accordance with claim 21 wherein:

the at least one additional parameter is a measure of operation of the rotating member.

24. A method in accordance with claim 21 wherein:

the rotating member is a shaft of a turbine.

* * * * *